United States Patent
Chintapalli et al.

(10) Patent No.: US 11,612,852 B2
(45) Date of Patent: Mar. 28, 2023

(54) TUNABLE, RAPID UPTAKE, AMINOPOLYMER AEROGEL SORBENT FOR DIRECT AIR CAPTURE OF $CO_2$

(71) Applicant: PALO ALTO RESEARCH CENTER INCORPORATED, Palo Alto, CA (US)

(72) Inventors: Mahati Chintapalli, Mountain View, CA (US); Stephen Meckler, Campbell, CA (US); Gabriel Iftime, Newark, CA (US); Rahul Pandey, San Jose, CA (US); Mary Louie, Menlo Park, CA (US); Eugene Shin Ming Beh, Menlo Park, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 17/211,588

(22) Filed: Mar. 24, 2021

(65) Prior Publication Data

US 2021/0370226 A1 Dec. 2, 2021

Related U.S. Application Data

(60) Provisional application No. 63/031,098, filed on May 28, 2020.

(51) Int. Cl.
*B01J 20/26* (2006.01)
*B01J 20/28* (2006.01)
(Continued)

(52) U.S. Cl.
CPC .......... *B01D 53/14* (2013.01); *B01J 13/0065* (2013.01); *B01J 13/0091* (2013.01);
(Continued)

(58) Field of Classification Search
None
See application file for complete search history.

(56) References Cited

U.S. PATENT DOCUMENTS

| 5,631,327 A | 5/1997 | Beckman |
| 10,421,253 B2 | 9/2019 | Van Overmeere et al. |

(Continued)

FOREIGN PATENT DOCUMENTS

| WO | 00/56790 A1 | 9/2000 | |
| WO | 02/18464 A2 | 3/2002 | |
| WO | WO-2019241603 A1 * | 12/2019 | ................ C08J 9/00 |

OTHER PUBLICATIONS

ISR and Written Opinion, PCT/US2021/030661, dated Jul. 22, 2021, 13 pp.

(Continued)

*Primary Examiner* — Daniel Berns
(74) *Attorney, Agent, or Firm* — Miller Nash LLP (57) ABSTRACT

A porous polymer aerogel, wherein the aerogel has greater than 5 wt % of amine containing vinyl monomers integrated into a polymer backbone. A method of fabrication of a porous polymer aerogel amine material, includes preparing a solution comprising at least a solvent, amine monomers having protected amino groups, one or more crosslinkers, one or more radical initiators, and a nitroxide mediator, removing oxygen from the solution, heating the solution to promote polymerization and to produce a polymerized material, performing solvent exchange with the polymerized material, causing a deprotection reaction in the polymerized material to remove groups protecting the amino groups, soaking and rinsing the material to remove excess reagents and any byproducts of the deprotection reaction, and drying the material to produce the amine sorbent. A system to separate CO2 from other gases, comprising a polymer (Continued)

porous aerogel sorbent having greater than 5 wt % of amine containing vinyl monomers integrated into a polymer backbone.

17 Claims, 4 Drawing Sheets

(51) Int. Cl.
B01D 53/14 (2006.01)
B01J 13/00 (2006.01)
C08J 3/24 (2006.01)

(52) U.S. Cl.
CPC ............... *B01J 20/264* (2013.01); *C08J 3/24* (2013.01); *B01D 2253/202* (2013.01); *B01D 2253/311* (2013.01); *B01D 2257/504* (2013.01); *B01J 20/28057* (2013.01); *B01J 20/28069* (2013.01); *C08J 2205/026* (2013.01)

(56) References Cited

U.S. PATENT DOCUMENTS

| | | |
|---|---|---|
| 10,836,855 B2 | 11/2020 | Chintapalli et al. |
| 2017/0252718 A1* | 9/2017 | Jamart ................ D06M 13/422 |
| 2019/0106543 A1 | 4/2019 | Chintapalli et al. |

OTHER PUBLICATIONS

Bali, S. et al. "Oxidative Stability of Amino Polymer-Alumina Hybrid Adsorbents for Carbon Dioxide Capture," Energy & Fuels, 27:1547-1554 (2013).

Mohammadi, Z. et al. "In Situ Synthesis of Iron Oxide within Polyvinylamine Nanoparticle Reactors," J. Phys. Chem., 113:7652-7658 (2009).

Wang, H. et al. "Support-Free Porous Polyamine Particles for CO2 Capture," ACS Macro Letters, 1:944-948 (2012).

Tillet, G. et al. "Chemical reactions of polymer crosslinking and post-crosslinking at room and medium temperature," Progress in Polymer Science, 36:191-217 (2011).

Zhu, J., et al. "Synthesis and characterization of poly(vinyl amine)-based amphiphilic comb-like dexlian glycopolymers by a two-step method," J. Polymer Science: Part A: Polymer Chemistry, 44:192-199 (2006).

Sjostrom, S. and Senior, C., "Pilot testing of CO2 capture from a coal-fired power plant-Part1: Sorbent characterization," Clean Energy, 3:2, 144-162 (2019).

Alesi, Jr., and Kitchin, J., "Evaluation of a Primary Amine-Functionalized Ion-Exchange Resin for CO2 Capture," I&EC Research, 51:6907-6915 (2012).

Green, D. et al., "Carbon Dioxide Capture from Flue Gas Using Dry Regenerable Sorbents," US Dept. Energy, Quarterly Technical Progress Report, Research Triangle Institute, Nov. 2004, 15 pages.

Kim, Jae-Young, et al., "Continuous Testing of Silica-PEI Adsorbents in a Lab.-Scale Twin Bubbling Fluidized-Bed System," Korea Institute of Energy Research, University of Nottingham, Faculty of Engineering, JGGC-2018, AAM-Accepted Jan. 9, 2019.

Luz, I, et al., "Confining Metal-Organic Framework Nanocrystals within Mesoporous Materials: A General Approach via Solid State' Synthesis", Chem. Mater., 29:9628-9638 (2017).

* cited by examiner

TUNABLE, RAPID UPTAKE, AMINOPOLYMER AEROGEL SORBENT FOR DIRECT AIR CAPTURE OF $CO_2$

RELATED APPLICATIONS

This application claims priority to and the benefit of U.S. Provisional Application No. 63/031,098 filed May 28, 2020, which is incorporated by reference herein in its entirety.

TECHNICAL FIELD

This disclosure relates to capture of carbon dioxide, more particularly to direct air capture using solid sorbents.

BACKGROUND

In the coming decades, integrated assessment modeling predicts that negative $CO_2$ emissions could be required on the scale of ~10 Gigatons (Gt) of $CO_2$ per year in order to reach the International Panel on Climate Change target for 2° C. global warming. If deployed in concert with decarbonization activities and inexpensive, natural negative emissions approaches, direct air capture of $CO_2$ (DAC) is a promising strategy for climate change mitigation due to its low land use footprint, flexible requirements for plant siting, and compatibility with high capacity geologic sequestration reservoirs.

However, cost and energy of $CO_2$ capture in DAC is high, with cost estimates ranging from \$100-1000/ton-$CO_2$, and energy estimates of 4-13 GigaJoules/ton-$CO_2$. Compared to DAC processes that use liquid alkali sorbents, DAC processes with solid sorbents have greater potential to reduce cost and energy consumption because of their simpler process flows, faster $CO_2$ uptake, elimination of evaporative heat loss, lower sensible heat load in regeneration, and lower regeneration temperatures of less than 200° C. instead of greater than 700° C. Compared to DAC or other $CO_2$ capture processes with liquid amines, solid sorbents are more chemically stable and release fewer volatiles.

However, in order to bring down the cost and energy consumption of DAC, significant advances in solid sorbent materials are needed. In particular, the National Academy of Sciences (NAS) recently identified the need to develop sorbent materials with (1) increased $CO_2$ capacity, (2) faster diffusion kinetics, (3) longer cycle lifetime, (4) cost below \$50/kg, and (5) minimized sensible heat load from inert supports.

SUMMARY

According to aspects illustrated here, there is provided a porous polymer aerogel, the aerogel having greater than 5 wt % of amine containing vinyl monomers integrated into a polymer backbone.

According to aspects illustrated here, there is provided a method of fabrication of a porous polymer aerogel amine material that includes preparing a solution comprising at least a solvent, amine monomers, one or more crosslinkers, one or more radical initiators, and a nitroxide mediator, removing oxygen from the solution, heating the solution to promote polymerization and to produce a polymerized material, performing solvent exchange with the polymerized material, causing a deprotection reaction in the polymerized material to remove groups protecting the amino groups, soaking and rinsing the material to remove excess reagents and any byproducts of the deprotection reaction, and drying the material to produce the amine sorbent.

According to aspects illustrated here, there is provided a system to separate $CO_2$ from other gases, the system having a polymer porous aerogel sorbent having greater than 5 wt % of amine containing vinyl monomers integrated into a polymer backbone.

DETAILED DESCRIPTION OF THE EMBODIMENTS

The embodiments here involve a solid sorbent and process for its fabrication that will deliver simultaneous advances in all areas identified by the National Academy of Sciences (NAS), with the potential to achieve a disruptive process cost below \$100/ton-$CO_2$.

Due to the low content of $CO_2$ in air, approximately 400 ppm, in DAC, materials with high selectivity chemical sorption are required. Due to high $CO_2$-selectivity, moisture-tolerance, high heat of adsorption, and low cost, solid amine-modified materials are the most promising solid sorbent materials for DAC. A wide range of amine-modified sorbents have been reported but process costs remain high due to materials and process limitations. For example, one approach uses a solid amine sorbent and reports a cost of \$600/ton-$CO_2$. Other materials such as MOFs and porous polymer networks (PPNs), which are amorphous hyper crosslinked networks of rigid, tetrahedral monomers, have been proposed, but these suffer from high cost, degradation in moisture, and slow uptake rates due to small pore size.

The embodiments here involved the use of aminopolymers aerogel sorbents for direct air capture of $CO_2$. The embodiments of TRAPS are shown in comparison with state of the art (SOA) sorbents (Table 1).

TABLE 1

Aminopolymer aerogel properties vs. state-of-the-art sorbents, in DAC conditions.

| Material | PEI/ Silica | Amine-grafted Silica | MOFs | Porous Polymer Networks | Embodiments |
| --- | --- | --- | --- | --- | --- |
| Equilibrium $CO_2$ loading [mmol/g] | 2-2.5 | 1-2 | 1-3.9 | <1 | >1, >3, >4 |
| $CO_2$ uptake kinetics [mmol/g/min] | 0.007 | 0.01-0.05 | 0.01 | No data, ~MOF | 0.15 |

TABLE 1-continued

Aminopolymer aerogel properties vs. state-of-the-art sorbents, in DAC conditions.

| Material | PEI/ Silica | Amine-grafted Silica | MOFs | Porous Polymer Networks | Embodiments |
|---|---|---|---|---|---|
| Cost [$/kg] | 25 | <50 | 50-100 | 100-1000 | 5-17 |
| Degradation (% capacity fade/cycle) | 0.5-7 | <2 | 1 | High | <0.05 |
| Minimum sensible heat [kJ/mol-$CO_2$] | 40 | 80 | 30 | No data | 26 |
| Specific surface area [$m^2$/g] | <100 | 100-400 | 1000 | 500-730 | >500 |
| Pore size [nm] | N/A | <10 | <1 | 1-100 | 10-30 |

In general, low cost sorbents such as amine-grafted or amine-impregnated silicas have low capacities, high sensible heat loads, and high. In contrast, high capacity sorbents such as metal organic frameworks (MOFs) or porous polymer networks have the disadvantage of high cost. The term "sensible heat load" refers to the amount of energy needed to increase or decrease the temperature of a substance.

The embodiments here involve a novel material comprised of a scalable mesoporous polyamine aerogel with high accessible surface area and high content of backbone-integrated amine groups for selective $CO_2$ sorption in Direct Air Capture (DAC) conditions. The embodiments also include a novel process for direct incorporation of low molecular weight amines such as vinyl amine and allyl amine, while not being restricted to only primary amines, from amino-vinyl monomers by controlled radical polymerization process. This achieves high content of amine functionalities in the sorbent, which enables high $CO_2$ loading capacity.

The embodiments here will have higher specific surface area at comparable pore-sizes in the range of 10-1000 nm than amine-grafted mesoporous silicas, or amines blended with porous ceramic supports such as blends of polyethylenimine. This increases gas-sorbent interaction and results in faster loading/unloading rates.

Due to the use of starting materials with highly active primary amines and avoidance of inert support, the embodiments will have higher equilibrium specific capacity than conventional unsupported as well as ceramic-supported polyamines.

The tunability of the synthesis platform of the embodiments enables covalent integration of amines into the polymer backbone and precise control of the steric environment to achieve longer lifetimes than conventional polyamines.

Figure 1:
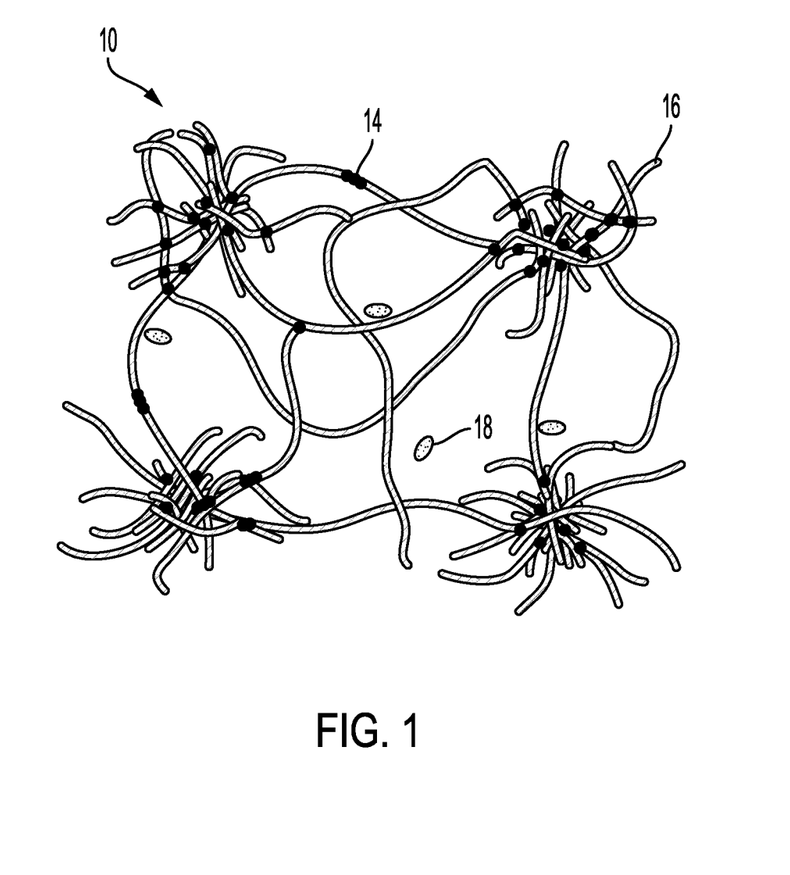
FIG. 1 shows an embodiment of a solid sorbent according to the present embodiments.

FIG. 1 shows a diagram representing the resulting solid sorbent 10 of the embodiments. The polyamines 16 are integrated into the polymer backbone in high content enabling high amine content overall, in the sorbent. In one example, an aerogel that is the result of copolymerization of a mixture containing 90 wt % vinyl amine, which is the smallest vinyl amine analog, and 10 wt % crosslinker, the content of nitrogen atom in the aerogel is 29.3 wt %. An aerogel made entirely of vinyl amine without any crosslinker, would have a content of nitrogen atom equal to 32.55 wt %. In practice, the percentage of nitrogen in aerogels suitable for the purpose of this application, may range from 1 wt % to 33 wt %. This high content of polyamines, together with the small pore walls, as an example 10 nm, give the polymer backbone a high $CO_2$ loading capacity in the range of 4 mol $CO_2$/kg, over 1 mol $CO_2$/kg or 1-4 mol $CO_2$/kg, or 1-5 mol $CO_2$/kg. The embodiment may be an aerogel has a loading capacity over 1 mmol $CO_2$/g of sorbent at temperatures greater than 0° C. and $CO_2$ concentration of less than 1000 ppm.

The embodiments include an aerogel having uptake kinetics of greater than 0.05 mol $CO_2$ per kilogram minute, including at temperatures greater than 0° C. and $CO_2$ concentration of less than 1000 ppm. In one embodiment, the resulting aerogel has greater than 5 wt % of amine containing vinyl monomers integrated into a polymer backbone.

The backbone polymer has cross-linkers such as 14, but of lower content, allowing mechanical robustness and low sensible heat load to the sorbent while further contributing to increased capture of $CO_2$ 18. The sorbent has fast kinetics, in the range of 0.15 mol $CO_2$/kg·min, is mesoporous with pore size in the range of 10-30 nm as an example, and has a specific area of over 500 $m^2$/g. The sorbent kinetics can also be in the range of 0.01-0.5 mol $CO_2$/kg·min, 0.05-0.5 or any subset of those ranges. The pore sizes of the sorbent can also range from 1-50 nm, 1-100 nm, 1-200 nm, or 1-500 nm, or subsets and combinations of those ranges. The sorbent can also have specific surface area of greater than 100 $m^2$/g, 200 $m^2$/g, 300 $m^2$/g, 400 $m^2$/g, 600 $m^2$/g, 700 $m^2$/g, 800 $m^2$/g, 900 $m^2$/g, 1000 $m^2$/g, 1100 $m^2$/g, and 1200 $m^2$/g.

Figure 2:
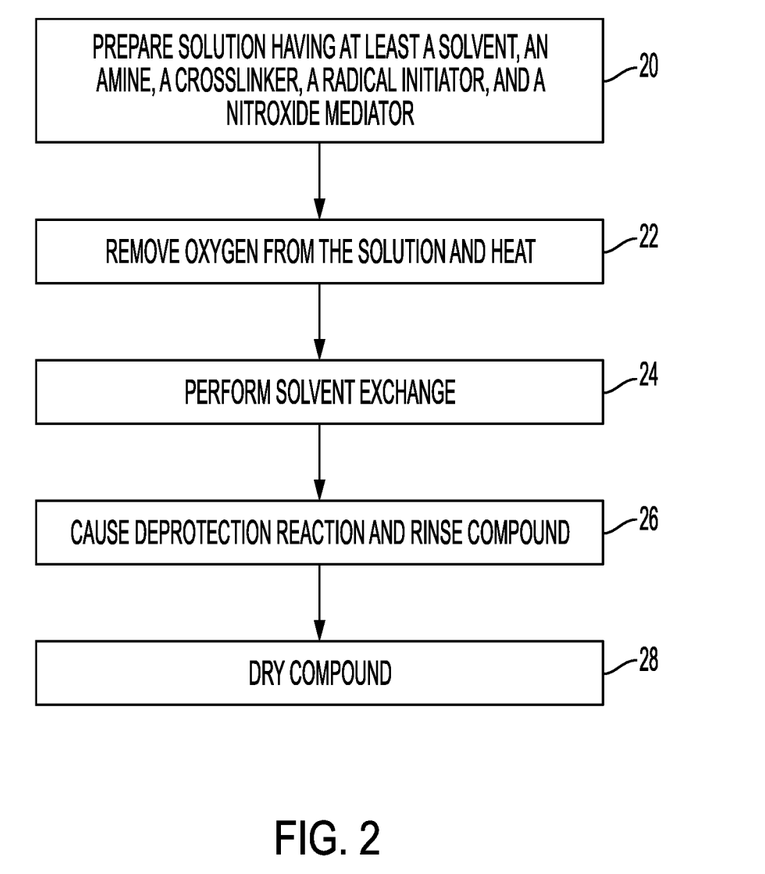
FIG. 2 shows a flow chart of an embodiment of a process to manufacture a high amine loading sorbent.

One embodiment is a process for fabrication of porous polymer aerogels with high content backbone-integrated amine groups and with small size pores and thin pore polymer walls. FIG. 2 shows an embodiment of a process. One should note that no order of the subprocesses is implied nor should any be inferred. The process involves preparation of a solution at 20 that includes a solvent, low molecular weight vinyl amine monomers, one or more crosslinkers comprising two or more vinyl groups, one or more radical initiators, a nitroxide mediator, and possibly one or more reducing agents, although these are optional. The low molecular weight vinyl amine monomers may have the amine group protected to prevent its reaction with other vinyl reagents including the crosslinkers and vinyl amine themselves.

Low molecular weight means having molecular weight below 100 g/mol, below 300 g/mol, below 1000 g/mol, or below 5000 g/mol. A vinyl amine is a molecule that contains a vinyl functional group or a functional group that contains a vinyl group such as an acrylate or methacrylate, and an amine group (primary, secondary, or tertiary), $RNH_2$, $R_2NH$, or $R_3N$. The amine in vinyl amine can also refer to functional groups that can be converted to amines such as amides, formamide, and others. The vinyl group and amine group may be bonded directly to each other, or may have other atoms or subgroups between them, such as 0-6 carbon atoms.

The process then removes oxygen from the above solution and heats the resulting solution at 22 to promote polymerization to produce a polymerized material. The process performs a solvent exchange at 24 with an appropriate solvent such as water or water mixtures with water-soluble organic solvents, polar solvents, mixtures of solvents containing a polar solvent, protic solvents or mixtures of solvents containing protic solvents. A deprotection reaction removes the amine protecting groups and the process rinses the material at 26. The solvent exchange and deprotection reaction may take place in either order. Soaking and rinsing the resulting material with water, water mixtures having water miscible organic solvents, polar solvents, mixtures of solvents containing a polar solvent, protic solvents, or mixtures of solvents containing protic solvents removes excess reagents and soluble deprotection reaction byproducts. Finally, drying produces the final amine sorbent at 28.

The embodiments have several unique features. These include development of polymer porous structures by direct incorporation of low molecular weight vinyl amine monomers by controlled radical polymerization, stable free radical polymerization (SFRP). They also include development of a synthetic process for co-polymerization of amine-containing vinyl monomers with vinyl crosslinkers, producing porous polymers with small pore size in the range of 10 nm-1000 nm, and thin walls in the range of 10-100 nm, and with high amine groups content of greater than 10 wt % of incorporated amine containing vinyl monomer integrated into the polymer backbone. Polymerization or co-polymerization of primary and secondary amine-containing vinyl monomers is not possible due to the reaction of the amine groups with vinyl groups present in the amine-containing vinyl monomers of the crosslinkers.

The process can be used to tune the diameter of the pore wall structures, ensuring full utilization of the polyamine and rapid uptake. With thicker pore walls found in prior art solid sorbents a large fraction of the amines are incorporated into the dense pore polymer wall and are kinetically unavailable for $CO_2$ capture. Thin polymer walls having thickness in the range of 10-100 nm, (or 1-100 nm, 1-500 nm, or 10-500 nm) achieved with the embodiments have two benefits, a higher surface area to volume ratio, and shorter diffusion time for gas to penetrate the solid material, and as a result, more of the amino groups are available for interaction with gas for $CO_2$ capture. The net effect is an increased $CO_2$ capture capability when compared with current approaches.

Other unique aspects include high amine loading which provides increased $CO_2$ equilibrium loading capacity under DAC ambient conditions. Particularly beneficial are primary amine groups chemically optimized for low-$CO_2$ partial pressure adsorption. They also include increased mechanical and physical stability of sorbent particles made from this porous sorbent material, measured by increased crush strength resistance and decreased attrition index, which make particles made with the disclosed amine sorbent suitable for $CO_2$ capture by fluidized bed processes. The embodiments have improved stability against thermal and oxidative degradation when compared with other sorbents such as silica grafted with longer amine chains and other solid or liquid amine sorbents. This improved stability results from the steric effect of the polymer backbone that is in very close proximity to the amine groups and by elimination of metals that catalyze degradation.

Figure 3:
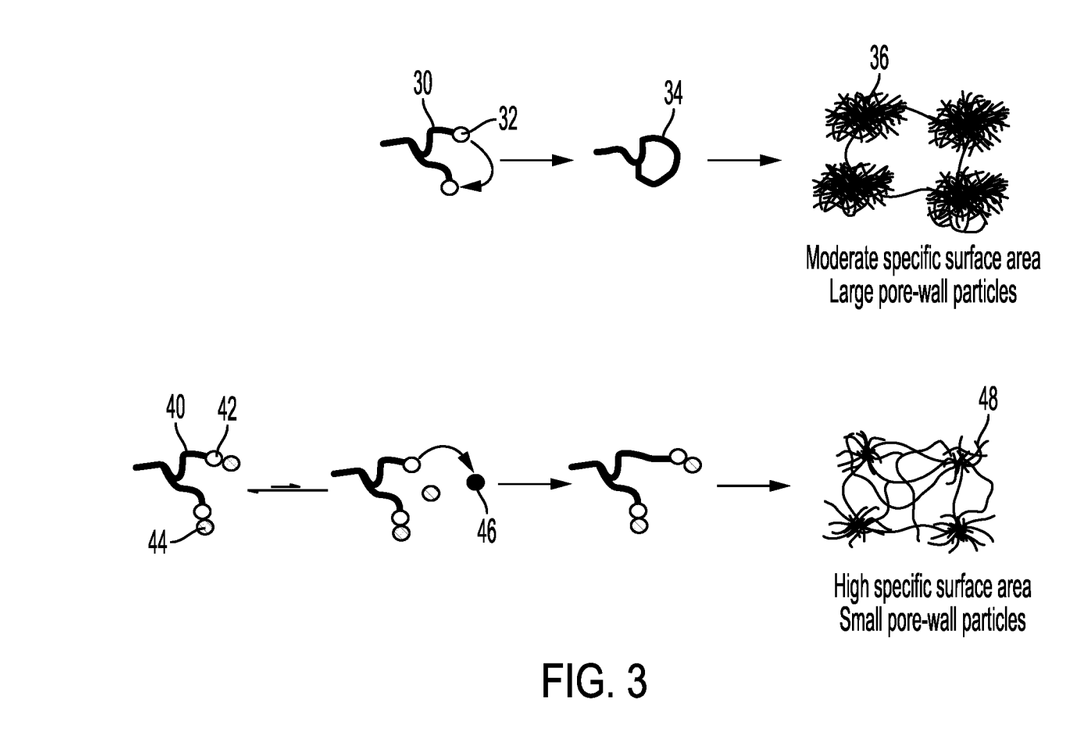
FIG. 3 shows a comparison of polymers from conventional radical polymerization and from controlled radical polymerization.

The SFRP (stable free radical polymerization) aerogel process has been demonstrated in a variety of non-amine monomers, such as those disclosed in US Patent Publication No. 2020/0031977, and U.S. Pat. No. 10,421,253 incorporated by reference herein in their entirety. As shown in FIG. 3, in conventional radical polymerization, various polymer chain ends 30 grow at different rates and can terminate through chain-chain termination events by coupling of the radicals 32 at the end of the chain, producing an inactive polymer chain 34 which stops growing. The final result is a porous sorbent structure made of large aggregate particles 36 that has moderate specific surface area and large pore walls.

The SFRP unique aerogel process, similar to those processes patented by PARC (Palo Alto Research Center, Inc.) modulates chain growth and precipitation of nanogel clusters during polymerization as shown in the bottom of the diagram. In SFRP, a nitroxide mediator 44 reversibly binds to the ends 42 of growing chains 40, producing a 'dormant' state. Chain growth occurs only when the nitroxide mediator 44, such as TEMPO-OH, decouples from the chain end and allows a new monomer molecule 46 to react with the growing chain. As chains spend most of the time in the dormant state, the reaction proceeds as a living polymerization with lowered probability of undesirable chain termination events. The end result is a high porosity polymer structure 48 with high specific surface area and thin walls. SFRP decreases the pore wall size and increases the surface area at equivalent porosity.

Previous work shows that polymerization or co-polymerization of primary and secondary amine-containing vinyl monomers is not possible due to the reaction of the amine groups with vinyl groups present in the amine-containing vinyl monomers of the crosslinkers (Tillet, G., Boutevin, B. & Ameduri, B. Chemical reactions of polymer crosslinking and post-crosslinking at room and medium temperature. *Prog. Polym. Sci.* 36, 191-217 (2011)). The processes of these embodiment utilizes vinyl amine monomers wherein the amine groups are protected during the polymerization step. The protecting groups are removed after polymerization to produce the porous polymer aerogels with a high content of backbone-integrated amine groups, which are enabled to capture $CO_2$. Any process for protecting/deprotecting the amine groups is suitable for the purpose of the embodiments. In some cases, secondary and tertiary amines do not require protecting groups. In secondary and tertiary amines, a nitrogen atom is bonded to one or zero hydrogens and two or three non-hydrogen atoms or chemical groups. In cases where a protecting group is not needed, one or two of the non-hydrogen groups prevent side reactions during polymerization.

One process for protection/deprotection of primary and secondary amine containing vinyl monomers has been described previously at http://cssp.chemspider.com/article.aspx?id=103. Protection by reaction with formamide typically involves reacting the amine with formic acid in acetic anhydride while heating typically at 50-80° C., followed by solvent evaporation and purification by chromatography.

Figure 4:
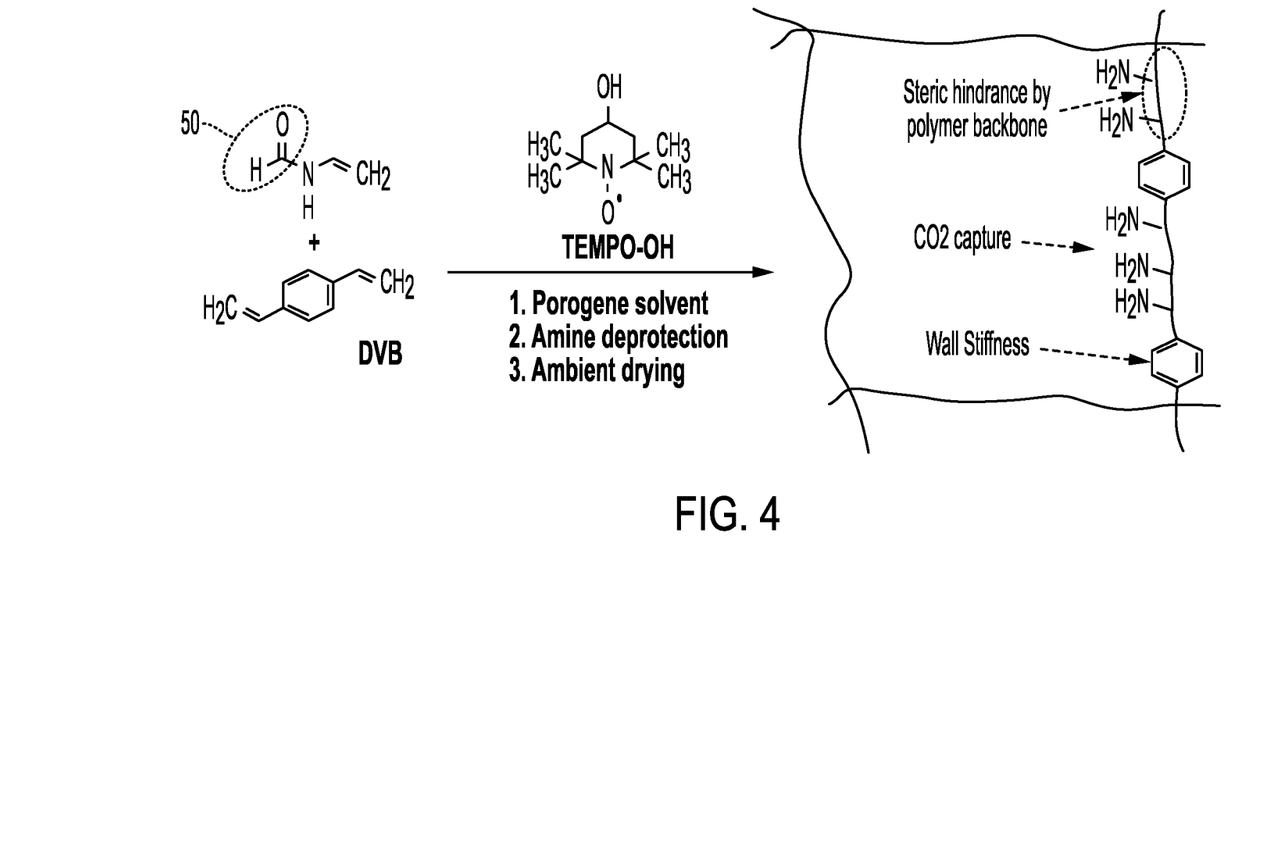
FIG. 4 shows an embodiment of a process of fabricating high amine loading sorbent.

FIG. 4 illustrates an embodiment of a synthetic process. Vinyl monomers with protected amines are suitable because they can be efficiently polymerized by conventional (uncontrolled) radical polymerization process. N-vinylformamide (1), wherein the amine is protected by formaldehyde at 50 is an example suitable for the present embodiments (Zhu, J., Gosen, C. & Marchant, E. R. Synthesis and Characterization of Poly(vinyl amine)-Based Amphiphilic Comb-Like Dextran Glycopolymers by a Two-Step Method. *J Polym Sci Part A Polym Chem* 44, 192-202 (2006)). In the first step, a solvated gel is fabricated by copolymerization of the N-vinylformamide with multifunctional crosslinker such as for example divinylbenzene (DVB, trimethylolpropane trimethacrylate, 1,6-hexanediol diacrylate, multifunctional acrylates, or multifunctional methacrylates) in SFRP conditions (100-130° C., 6-48 hr), initiated by an initiator such as benzoyl peroxide, lauroyl peroxide, or AIBN and by using a nitroxide mediated chain growth additive (TEMPO, TIPNO, SG1, TEMPO-OH) in a suitable solvent as a porogen. To achieve porosity of greater than 30%, solvent concentrations ranging from 50-80 wt % of the overall solution may be used. In general, solvent concentrations 20-90 wt % or 20-99 wt % may be used. In the second step, the amine is regenerated by removing the formyl group under acidic and basic conditions, and optionally with ion exchange resins, as reported in prior art (Wang, and Mohammadi, Z., Cole, A. & Berkland, C. J. In situ synthesis of iron oxide within Polyvinylamine nanoparticle reactors. *J. Phys. Chem. C* 113, 7652-7658 (2009)). Finally, the solvated gel is dried under controlled ambient conditions, by protocols developed previously by PARC for non-amino aerogels.

Low molecular weight vinyl amines are preferred in order to increase the content of nitrogen atoms required for $CO_2$ capture. In the porous amine aerogel, the amine groups resulted from the polymerization of the amine vinyl monomers may connect to the polymer backbone by hydrocarbon chain consisting of 0 to 6 carbon atoms. As an example, if the vinyl amine monomer is vinyl amine, the number of carbon atoms in the connecting hydrocarbon chain is 0. If the vinyl amine monomer is 3-buten-1-amine, the number of carbon atoms in the connecting hydrocarbon chain is 2.

Suitable low molecular weight amines substituted vinyl monomers which are to be used as protected amines, for the present embodiments include: amine monomers having protected amine groups, low molecular primary amines including vinyl or amine monomers, i.e. containing polymerizable double bonds, include vinyl amine, allyl amine, 3-buten-1-amine, 4-pentene-1-amine, 3-vinylaniline, 4-vinylaniline, diamine vinyl monomers including 4-cyclohexene-1,2-diamine and the like. Also, amine containing acrylates and methacrylates are suitable for these embodiments, such as for example 2-aminoethyl methacrylate, 3-aminopropyl methacrylate.

Also, low molecular secondary amines are suitable for these embodiments. This include N-methylvinyl amine, N-ethyl vinyl amine, N-methyl-allyl amine, N-isopropylvinyl amine, N-tert-butylvinyl amine and generally any of the derivatives that are the result of substituting a hydrogen atom from a primary amine containing vinyl monomers.

Suitable vinyl crosslinkers include crosslinkers having two or more vinyl groups, vinyl crosslinkers having double bonds polymerizable groups, —CH=CH2, —C(R)=CH2, —C(R1)=C(R2)H, —C(R1)=C(R2)(R3), —CH=C(R1)(R2), where R, R1, R2, R3 are alkyl groups including methyl, ethyl propyl, isopropyl and the like. The double bond can be connected directly to a phenyl, biphenyl or anthraces radical such an in the case of divinylbenzene. The double bond may also be connected to an ester group, such as in the case of acrylates or methacrylates. Suitable examples of acrylate and methacrylate crosslinkers include tri, tetra, penta or hexa-acrylates and methacrylates such as trimethylolpropane triacrylate, trimethylolpropane ethoxylate triacrylate, di(trimethylolpropane) tetraacrylate, dipentaerythritol penta-/hexa-acrylate trimethacryl adamantane, dipentaerythritol, trimethylolpropane trimethacrylate, divinylbenzene, phenylene dimethacrylate, phenylene diacrylate, and 1,6-hexanediol diacrylate and similar.

Suitable solvents which act as porogens include polar aprotic organic solvents such as dimethylformamide, methyl ethyl ketone, tetrahydrofuran, diglyme (diethylene glycol dimethyl ether), 1,2-dimethoxy-ethane, ethyl acetate and others. Particularly suitable are high boiling solvents with a boiling temperature of greater than 160° C., greater than 150° C., or above 130° C., such as acetophenone (202° C.), dimethylsulfoxide (DMSO) (189° C.), sulfolane or n-methylpyrrolidone (202° C.). Solvent/monomer interaction strength can be tuned to affect porosity and pore size. Generally unfavorable interactions result in larger pore sizes and larger pore wall features.

Suitable radical initiators include thermal initiators—activated by heat—and photoinitiators which are activated by light, typically Ultra Violet in a range of about 200 nm to 400 nm wavelength. Non-limiting examples of thermal initiators includes (a) peroxides such as benzoyl peroxide, diacetylperoxide, di t-butylperoxide, lauroyl peroxide, dicumyl peroxide; or azo compounds such as Azobisisobutyronitrile (AIBN) and phenylazotriphenylmethane. Non-limiting examples of photoinitiators include benzophenone, anthaquinone, camphorquinone, benzyl, benzoin and the like.

Suitable nitroxide mediators include nitroxide species derived from the decomposition of an alkoxyamine, 4-hydroxy-TEMPO, TEMPO and other TEMPO derivatives, TIPNO and TIPNO derivatives, chlorobenzyl-TIPNO, SG1 and other SG1 derivatives, and a methacrylic acid radical. A portion of a stable free radical may remain in the aerogel structure.

Suitable reaction temperature will typically be in a range from 70° C. to 200° C. depending on the initiation temperature of the radical initiator and reactivity of the stable free radical.

The concentration of the amine containing vinyl monomers together with crosslinkers in the solvent is comprised in a range from 1% to 60% wt of the overall solution. Generally, the lower the concentration of monomers and crosslinkers the higher the porosity of the sorbent.

After polymerization, the formyl group is typically removed by hydrolysis under basic or acid conditions followed by rinsing and treatment with ion exchange resins (Wang). In the proposed process from this disclosure, removal of the reagents in excess and of soluble deprotection reaction byproducts by soaking and rinsing with water and with water mixtures having water miscible organic solvents. Suitable water miscible solvents include alcohols including methanol, ethanol, propanol, isopropanol and the like, as well as acetone and THF for example. One or more water miscible solvents can be used. The amount of water miscible solvent in the water solution can range from 0.5% to 99.5% of the total weight of the solution.

Drying may involve either ambient, freeze-drying or supercritical $CO_2$ drying. In ambient drying, the gel immersed in a solvent such as alkanes including hexane, heptane or more polar solvents such as acetone, tetrahydrofuran (THF) or alcohols including methanol, ethanol, isopropanol and the like, is first dried at room temperature and pressure, and then possibly in vacuum. In freeze-drying, first the sorbent is frozen (by decreasing the temperature below the freezing point of the solvent) then the solvent is removed by sublimation in vacuum. In supercritical $CO_2$ drying, gels are solvent exchanged with liquid $CO_2$ and supercritically dried.

In order to reduce kinetic barriers, the embodiments must exhibit high porosity, high specific surface area, and thin pore walls. The thin pore walls enable rapid gas diffusion, $CO_2$ chemisorption, and diffusion into the bulk at 10 nm scale. In some embodiments, porosity is greater than 10%. In other embodiments, porosity is greater than 20%, 30%, 40%, 50%, 60% and 70%. Thermodynamically, a high loading of selective chemisorbing moieties is needed to capture large amounts of $CO_2$ at low partial pressures. The embodiment platform provides explicit control over both the amine loading and sorbent pore characteristics. SFRP aerogel process results in gels with higher specific surface areas and smaller pore wall thicknesses compared to those synthesized using uncontrolled radical polymerization shown in FIG. 3.

Important reaction parameters can be leveraged to tune these tradeoffs. Nitroxide mediators reversibly cap the ends of polymer chains during SFRP; however over the course of reaction, excess nitroxide builds due to chain termination. If excess nitroxide is unchecked, polymerization arrests. To counteract this effect, reducing agents such as reducing sugars such as glucose, reagents containing hemiacetal groups, hydroxyacetone, or enediol species derived from ketones and aldehydes, such as ketose and aldose sugars, are used to gradually consume the nitroxide and maintain the ratio of nitroxide to living radicals. Initiators with slow decomposition rates are also effective at counteracting accumulation of excess free nitroxide. By systematically tuning parameters such as the solvent-monomer interaction strength, radical initiator half-life, and concentrations of solvent, nitroxide, reducing agent, and radical initiators, various pore structures can be obtained from the same set of monomers.

Controlling the steric environment of the amines maximizes stability and amine utilization. It is expected that amines in a more flexible bonding environment will adsorb $CO_2$ more strongly with a higher heat of adsorption, whereas more steric hindrance will inhibit oxidation. Due to the tunability of the embodiment platform, variants of vinylamine such as allylamine or a secondary amine monomer can easily be substituted in the synthesis to fine-tune the steric environment and flexibility of amines.

The embodiments here provide control over the pore wall thickness. The size of the rough, porous particles that make up the pore walls can be tuned in the 10-100 nm range, or 5-200 nm range, 5-500 nm range, 10-1000 nanometers by altering the polymerization activity, which is a measure of the influence the nitroxide mediators have on the polymerization. Pore wall particles are permeable to gases and maximize $CO_2$ capture capability by enabling interaction with amine groups inside the polymer wall. This is a distinctive advantage of the sorbent from these embodiments. Based on typical porosities and surface areas, the hard sphere length scale of the pore wall structures is around 10-100 nm.

The embodiments have advantages over liquid amine sorbents used for sorption at flue gas concentrations by greatly decreasing inert, sensible heat load and decreasing chemical degradation. Highly mobile amines optimized for flue gas conditions are more prone to oxidation and side-reactions than solid, immobilized amines.

The sorbent of these embodiments may be deployed in systems having fixed bed, fluidized bed, or monolith-type sorbers. The aerogel synthesis process is flexible and can be used to produce aerogels in a variety of form-factors ranging from 1-100 μm particles to $0.3 \times 10 \times 10$ cm$^3$ or larger monoliths. The sorbent can be produced as monoliths, binder-free pellets, binder-containing pellets, particles, fluidizable particles, or particles cast onto macroporous substrates and other materials.

The embodiments achieve high specific surface areas at moderate, not extremely high porosities. Due to lower porosity, the embodiments will have higher thermal conductivity than silica aerogels, around 0.14 W/mK, or greater than 0.02, 0.05, 0.07, or 0.1 W/mK, enabling rapid heat exchange.

While smaller size pores are preferred in the range of 10-30 nm, larger size pores are also suitable, such as a range comprised from 10 nm-1000 nm, but they may change the surface area of the sorbent. The thinner the pore wall, the better the better the gas diffusion through the pore wall and the higher the $CO_2$ loading capacity. Thicker walls in the range of 10-100 nm are also suitable for the embodiments because they may be beneficial for improving mechanical strength of the sorbent, but they may decrease the $CO_2$ capture loading efficiency. A trade-off between these two-performance metrics may be required to achieve optimal mechanical strength and $CO_2$ loading capacity. The optimal ranges depend on the mode of use of the sorbent.

The embodiments expect a 7× improvement in oxidative-stability over conventional supported polyethylenimine (PEI) sorbents, due to the primary amine structure in the aerogel and covalent incorporation of amines in the backbone. The aerogel may also contain secondary amines. As with other polyamines, in DAC conditions with ambient humidity, oxidative degradation will be dominant. Recently, supported polyallylamine (PAA), which contains only primary amines, was shown to oxidize 7× more slowly than polyethylenimine (PEI), which contains a mix of less stable secondary and primary amines (Bali, S., Chen, T. T., Chaikittisilp, W. & Jones, C. W. Oxidative stability of amino polymer-alumina hybrid adsorbents for carbon dioxide capture. *Energy and Fuels* 27, 1547-1554 (2013)). Due to structural similarity, the embodiments should have similar oxidation behavior to PAA. The embodiments will also demonstrate low physical and chemical degradation rates, due to the rigid structure and covalent incorporation of amines in the polymer backbone. The embodiments have the potential to reach an economically viable lifetime of 10,000 cycles to 90% capacity maintained. The cycle life of the embodiments is estimated by extrapolating from the cycle life of a secondary amine sorbent based on the expected 7-fold improvement in oxidative stability and a shorter cycle time, assuming air is introduced at temperatures below 65° C.

The embodiments enable low minimum sensible heat load of below 50 kJ/mol, such as 26 kJ/mol $CO_2$ per half cycle by high $CO_2$ uptake capacity, because of high amine utilization, coupled with low content of $CO_2$-inactive co-monomer. The minimum sensible heat load may also be less than 10 kJ/mol, 20 kJ/mol, 30 kJ/mol, 40 kJ/mol, and 50 kJ/mol. This parameter is critical to energy of $CO_2$ capture and DAC process operating expenditures. The minimum energy requirement is 40-70% lower than that of conventional supported polyamines (Table 1), and lower than the heat of adsorption, which is in the range of 45-90 kJ/mol $CO_2$.

Crush strength and Attrition index (AI) values, which indicate compatibility of the sorbent with fixed and fluidized bed sorbers, are estimated from DOE-funded literature on benzyl amine ion exchange resins for flue gas capture (Sjostrom, S. & Senior, C. Pilot testing of $CO_2$ capture from a coal-fired power plant—Part 1: Sorbent characterization. *Clean Energy* 3, 144-162 (2019)). These have similar chemical structure and porosity to the embodiments (Alesi, W. R. & Kitchin, J. R. Evaluation of a primary amine-functionalized ion-exchange resin for CO 2 capture. *Ind. Eng. Chem. Res.* 51, 6907-6915 (2012)), but the embodiments have an AI below 0.5, and added benefits of higher $CO_2$ capacity and controlled porosity. These values compare well with the state of the art attrition-resistant fluid cracking catalysts having an AI in the range of 0.2-0.5, (Green, A. D. et al. Carbon Dioxide Capture from Flue Gas Using Dry Regenerable Sorbents. *DOE Report, DE-FC26-00NT40923* 128 (2004)), to which new fluidized bed particles are often compared. For comparison, for silica/PEI, the AI is greater than 2, (Kim, J. Y. et al. Continuous testing of silica-PEI adsorbents in a lab.-scale twin bubbling fluidized-bed system. Int. *J. Greenh. Gas Control* 82, 184-191 (2019)), for MOFs, the AI is greater than 10 (Luz, I., Soukri, M. & Lail, M. Confining Metal-Organic Framework Nanocrystals within Mesoporous Materials: A General Approach via 'solid-State' Synthesis. *Chem. Mater.* 29, 9628-9638 (2017)). Improved performance of the embodiments is due intrinsic toughness and plastic deformation of polymers.

The sorbent from the embodiments may be used for other applications beyond DAC, including capture of post combustion gases or indoor $CO_2$ removal. In DAC applications, adsorption can occur at ambient conditions. Ambient conditions are ambient humidity (40-70% RH), air composition, $CO_2$ concentration (100-5000 ppm $CO_2$ in air, 400-500 ppm $CO_2$ in air), temperature (−40 to 50° C., or 20-30° C.), and absolute pressure (0.5-2 bar, or 1 bar). In other applications, adsorption can occur at a wider range of conditions such as 0.1-50% $CO_2$, or 1-90% $CO_2$, 3-15% $CO_2$, or 3-50% $CO_2$, 0 to 100% RH, 1 mbar to 10 bar pressure, and 15-80° C. or 15-50° C. The sorbent may be used in a variety of systems and configurations to separate $CO_2$ or other acidic gases from air or other ambient gases.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the above embodiments.

What is claimed is:

1. A porous polymer aerogel, the aerogel having greater than 5 wt % of amine containing vinyl monomers covalently integrated into a polymer backbone, wherein the amine containing vinyl monomers have a molecular weight of less than 100 g/mol.

2. The porous polymer aerogel as claimed in claim 1, the aerogel having greater than 5 wt % of amine containing vinyl monomers integrated into a polymer backbone, the amine containing vinyl monomers containing a vinyl group and an amine group bonded by 6 or less carbon atoms.

3. The porous polymer aerogel as claimed in claim 1, wherein the aerogel has a nitrogen atom content comprised in a range from 1 wt % to 33 wt %.

4. The porous polymer aerogel as claimed in claim 1, wherein the aerogel has a porosity of greater than 10%.

5. The porous polymer aerogel as claimed in claim 1, wherein the aerogel has a specific surface area of at least 100 $m^2/g$.

6. The porous polymer aerogel as claimed in claim 1, wherein the aerogel has a wall thickness in the range of 10-100 nanometers.

7. The porous polymer aerogel as claimed in claim 1, wherein the aerogel has pores with sizes in the range of 10-1000 nanometers.

8. The porous polymer aerogel as claimed in claim 1, wherein the aerogel contains primary amines.

9. The porous polymer aerogel as claimed in claim 1, wherein the aerogel contains secondary amines.

10. The porous polymer aerogel as claimed in claim 1, wherein the aerogel contains a portion of a stable free radical.

11. The porous polymer aerogel as claimed in claim 1, wherein the aerogel has a loading capacity over 1 mol $CO_2$ per kilogram of aerogel.

12. The aerogel as claimed in claim 1, wherein the aerogel has loading capacity of greater than 1 mmol/g sorbent at temperatures greater than 0° C. and $CO_2$ concentration of less than 1000 ppm.

13. The porous polymer aerogel as claimed in claim 1, wherein the aerogel has uptake kinetics of greater than 0.05 mol $CO_2$ per kilogram minute.

14. The porous polymer aerogel as claimed in claim 1, wherein the aerogel has uptake kinetics of greater than 0.05 mol $CO_2$ per kilogram minute at temperatures greater than 0° C. and $CO_2$ concentration of less than 1000 ppm.

15. The porous polymer aerogel as claimed in claim 1, wherein the aerogel has better thermal and oxidative stability compared to solid or liquid amine sorbents.

16. The porous polymer aerogel as claimed in claim 1, wherein the aerogel has attrition index below 0.5.

17. The porous polymer aerogel as claimed in claim 1, wherein the aerogel has minimum sensible heat load below 50 kJ/mol.

* * * * *